United States Patent [19]

Tarna

[11] Patent Number: 4,941,586

[45] Date of Patent: Jul. 17, 1990

[54] CONTAINER

[75] Inventor: Tauno Tarna, Tampere, Finland

[73] Assignee: Sarvis Oy, Tampere, Finland

[21] Appl. No.: 298,091

[22] Filed: Jan. 18, 1989

[51] Int. Cl.⁵ ............................................. B65D 8/02
[52] U.S. Cl. ................... 220/83; 220/17.1; 220/91
[58] Field of Search ............ D32/53, 53.1, 54; 220/17.1–17.3, 83, 91, 92, 95

[56] References Cited

U.S. PATENT DOCUMENTS

| D. 26,849 | 3/1897 | Bell | D32/53 |
| D. 73,649 | 10/1927 | Eiffe | D32/53 |
| 2,839,220 | 6/1958 | Carlin | 220/91 |
| 3,579,705 | 5/1971 | Blumenschein | 220/91 |

FOREIGN PATENT DOCUMENTS

| 0069724 | 11/1945 | Norway | 220/91 |
| 0015642 | of 1895 | United Kingdom | 220/17.1 |

OTHER PUBLICATIONS

"Dairy Pails for Every", Montgomery Ward advertisement, p. 1010, 1941.

Primary Examiner—Jimmy G. Foster
Attorney, Agent, or Firm—Pollock, Vande Sande & Priddy

[57] ABSTRACT

An upwardly open container, such as a bucket, includes a receptacle portion and a handle for carrying the receptacle portion in a suspended position. A receptacle of a suitable depth is formed in the receptacle portion for receiving material and is defined by an inner side wall terminating in an upward direction in a brim, and in the direction of its depth by an inner bottom surface. The receptacle is contained within an outer side surface and an outer bottom surface which define the receptacle portion. The outer side surface terminates in an upward direction in the brim and forms a cross-section area of a substantially similar configuration along the most part of the direction of depth of the receptacle in a plane perpendicular to the direction of depth of the receptacle. The cross-section area is of an oblong configuration, allowing the container to be positioned in an ergonomically favorable position for carrying and handling it, such that the direction of oblongness extends substantially parallely with the direction of operation of the container.

12 Claims, 8 Drawing Sheets

CONTAINER

BACKGROUND OF THE INVENTION

The present invention relates to a container of an upwardly open type, such as a bucket, including a receptacle portion and a handle which allows the receptacle portion to be carried at the handle in a suspended position. The container including a receptacle of a suitable depth in the receptacle portion for receiving material and being defined sideways by an inner side wall terminating in upward direction in a brim, and in the direction of its depth by an inner bottom surface, said receptacle being contained within an outer side surface and an outer bottom surface of the receptacle portion, which surfaces define the main outer space-requiring dimensions of the container, whereby the outer side surface terminates in upward direction in the brim and forms a cross-section area of substantially similar configuration along the most part of the direction of depth of the receptacle in a plane perpendicular to the direction of depth of the receptacle.

The containers of the above type are used in handling different materials, such as for storage and transport of materials as well as for transferring material from one place to another, in which connection material may be poured out of the receptacle portion of the container.

The containers of such type, of which the usual denomination is bucket, are designed to be carried manually by one person. The containers of this type are round in horizontal cross-section. From an ergonomical point of view the transport by a man and other operations, such as pouring, associated with the container are not satisfactory, since especially in the case of large containers the operator must stretch his arm far from the body when carrying the container. Moreover, it is difficult to take hold of the bottom of the container and subsequently to pour material accurately out of it by tilting the container, when the container has the conventional round shape.

SUMMARY OF THE INVENTION

It is therefore an object of the present invention to provide a container which eliminates the drawbacks discussed above. The object of the invention is fullfilled by a container, wherein the cross-section area is of an oblong configuration, the oblongness allowing the container to be positioned in an ergonomically favorable position on carrying and handling it so, that the direction of oblongness extends substantially parallelly with the direction of operation of the container, such as carrying it or pouring material out of the receptacle.

The oblong configuration makes the receptacle portion narrower so that it can be carried nearer to the body without a need to reduce the inner, material receiving volume of the receptacle portion.

According to one preferred embodiment of the invention, the handle is U-shaped and fastened at its free ends to the brim of the container such that the connecting line between the fastening points to the brim extends transversely to the direction of oblongness of the receptacle portion.

Further preferred embodiments of the present invention and their advantages will become apparent in connection of the following description of the invention.

The invention will be now described in more detail with reference to the accompanying drawings, wherein

DETAILED DESCRIPTION OF THE PREFERRED EMBODIMENTS

Figure 3:
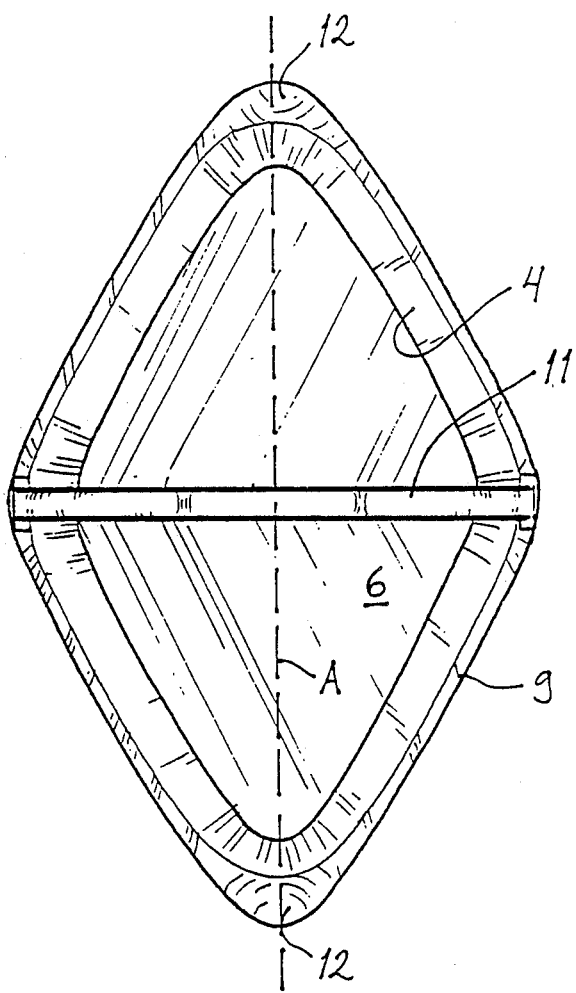
FIG. 3 is a top plan view of the container of the invention.
Figure 4:
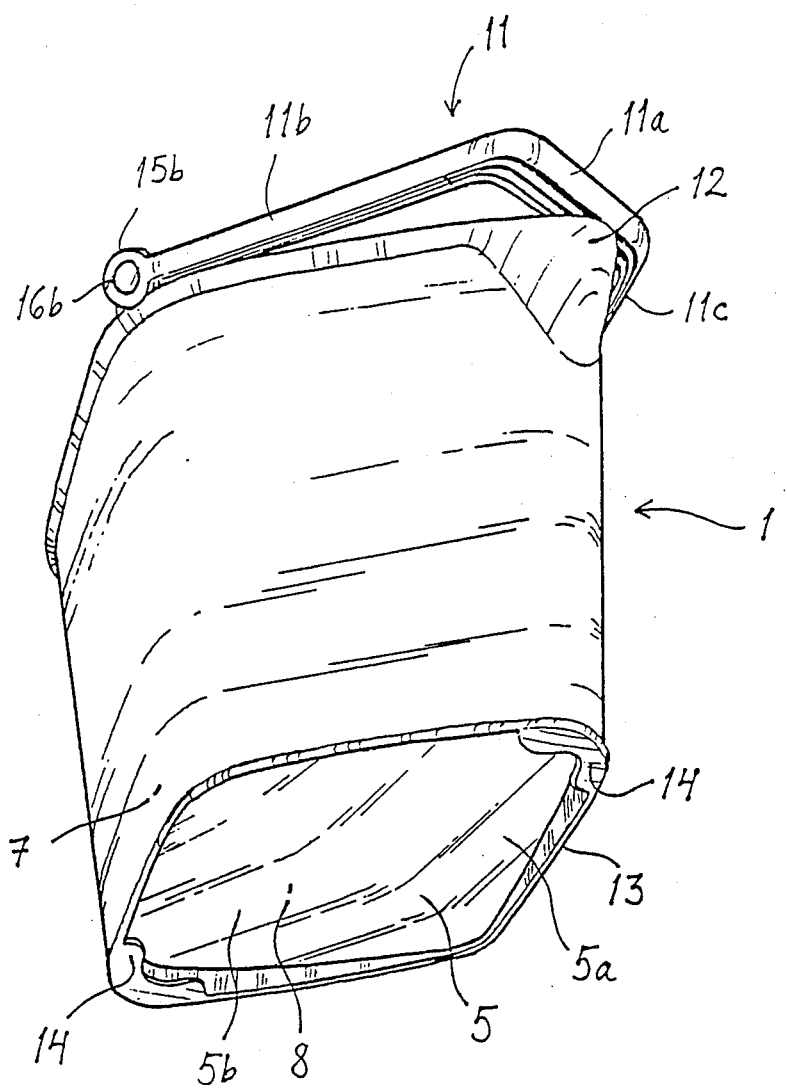
FIG. 4 is a perspective view of the container of the invention as viewed from below.

The container shown in the Figures is a bucket-type container having a receptacle portion 1, within which is contained the receptacle 2 for receiving the material to be carried and handled in the container. The receptacle portion has an outer side surface 3 and the receptacle 2 has an inner side surface 4. As best seen in FIG. 4, the receptacle portion 1 has an outer bottom surface 5, and the receptacle 2 has an inner bottom surface 6, as best seen in FIG. 3.

The outer side surface 3 and the inner side surface 4 lie on opposite sides of the receptacle portion side wall 7 of equal thickness, and therefore the cross-sections in a horizontal plane, that is in a plane perpendicular to the direction of depth of the receptacle 2, of the outer side surface 3 as well as of the inner side surface 4 have a similar shape. In a similar fashion, the outer bottom surface 5 and the inner bottom surface 6 are on opposite sides of a receptacle portion bottom wall 8 of equal thickness. The term "direction of depth" denotes the direction that coincides with the direction of force of gravity when the container is placed on a horizontal support surface.

The receptacle portion 1 is preferably made of plastics and fabricated by molding.

Figure 1:
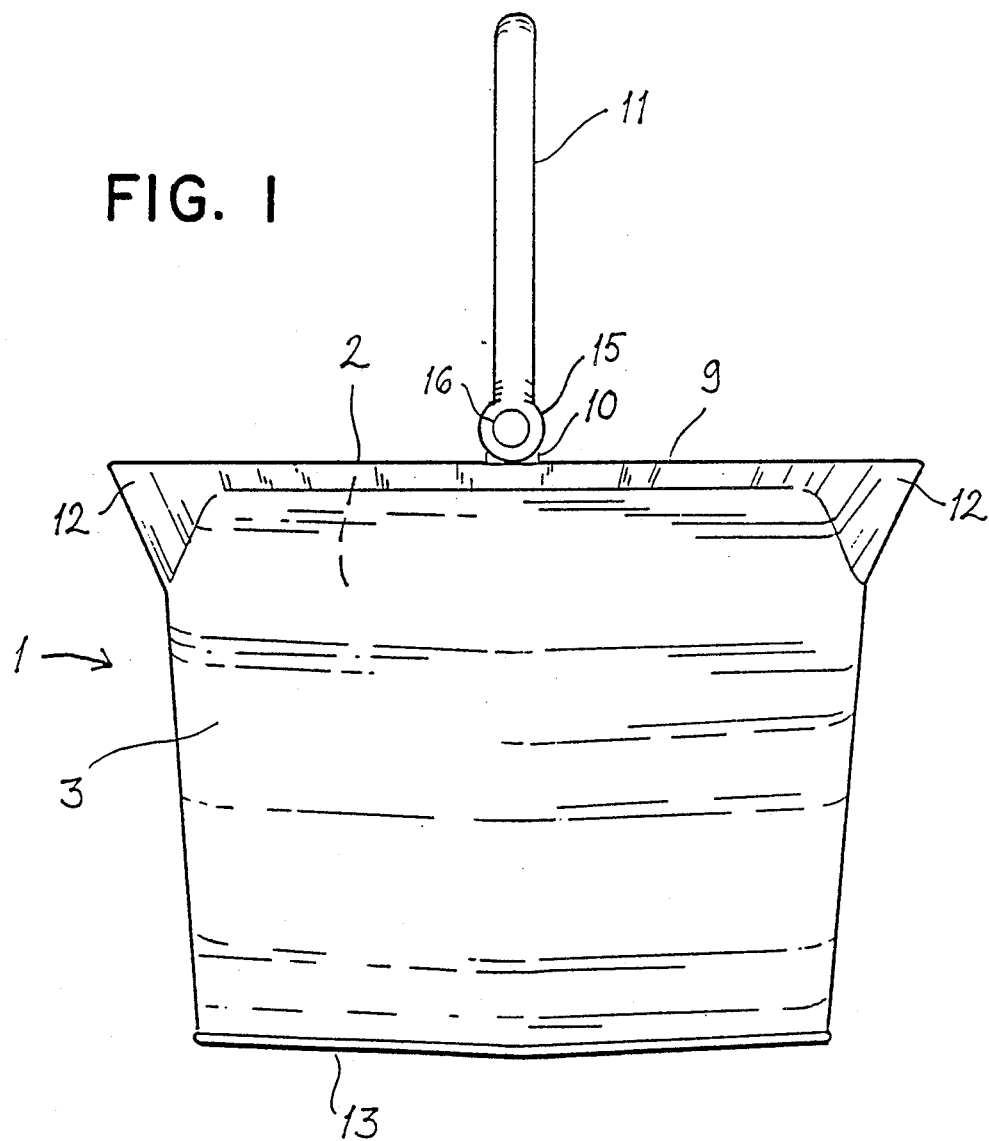
FIG. 1 is a side elevational view of the container of the invention present.
Figure 2:
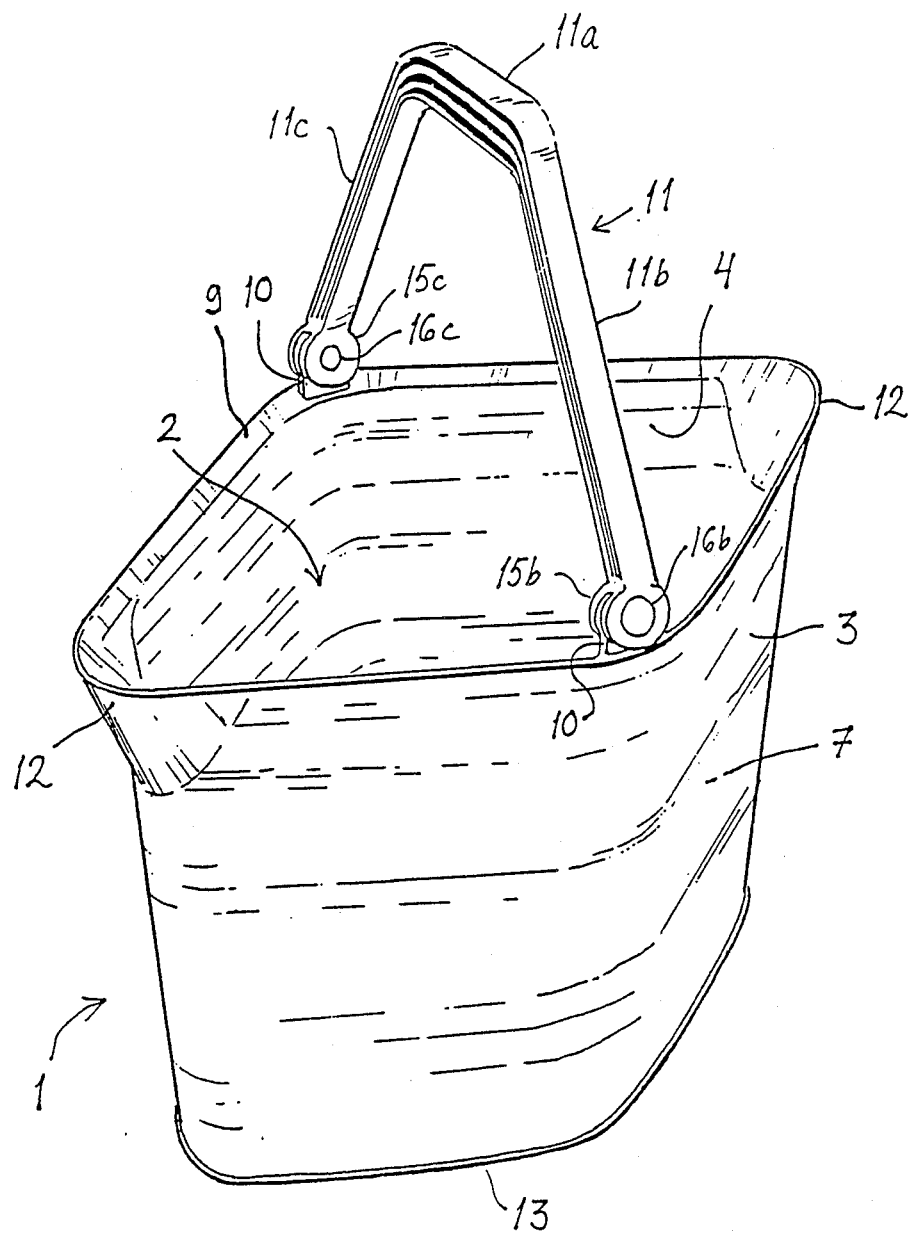
FIG. 2 is a perspective view of the container of the invention present as viewed from above.

The side wall 7 encircling the receptacle 2 terminates in upward direction in a brim 9. As best seen in FIG. 2, two lugs 10 protrude upwards from the brim 9 on opposite sides of the receptacle 2. A U-shaped handle 11 is pivotably fixed at its free ends onto the lugs 10 such that the receptacle portion 1 can be lifted, carried and tilted using the handle 11.

FIG. 3 illustrates the shape of the receptacle portion 1 in the plane perpendicular to the direction of depth of the receptacle 2. This common shape is identical along the most part of the direction of the depth, the only difference being such that the cross-section areas of the inner side surface 4 and the outer side surface 3 become slightly smaller in downward direction. The main outer space-requiring dimensions defined by the cross-section of the outer side surface 3 in the aforementioned plane are well seen in this Figure. The cross-section of the outer side surface 3 is of oblong configuration. This configuration has an imaginary center line, denoted by line A in FIG. 3, dividing the cross-section area into two portions of equal area. The configuration is symmetrical in a mirror-image fashion with regard to line A. Line A also denotes the direction of oblongness of the configuration. FIG. 3 shows, how the handle 11 extends perpendicularly to the line A when in vertical position.

The term "direction of oblongness" means in this context a direction parallel to or coinciding with the imaginary line with regard to which the maximum perpendicular distance of the periphery of the cross section from the line is at minimum. In the case of a rhomb this line coincides with the longer diagonal line of the rhomb, and in the case of an ellipse this line coincides with the line going via the foci of the ellipse.

It is preferable, that the oblong cross-section of the receptacle portion 1 has four corners, because this configuration can be used in a beneficial way when operating the container, for example, while carrying or pouring. The outer side surface portions between the corners may be straight or slightly curved, and it must be understood that the corners are not necessarily abrupt, for example they may be rounded.

Accordingly, the configuration is tetragonic, for instance rhombic with side surface sections of equal length between the corners, as seen in FIG. 3. The center line A coincides with the longer diagonal line of the rhomb, and the handle 11, or more precisely defined, the line between the fastening points of the handle 11 to the lugs 10, coincides with the shorter diagonal line of the rhomb.

It is understood, that other configurations may be used as well, provided that they have oblongness in some direction. However, the tetragonal shape, in particular a rhombic shape is advantageous for more reasons to be discussed hereinafter.

Figure 7:
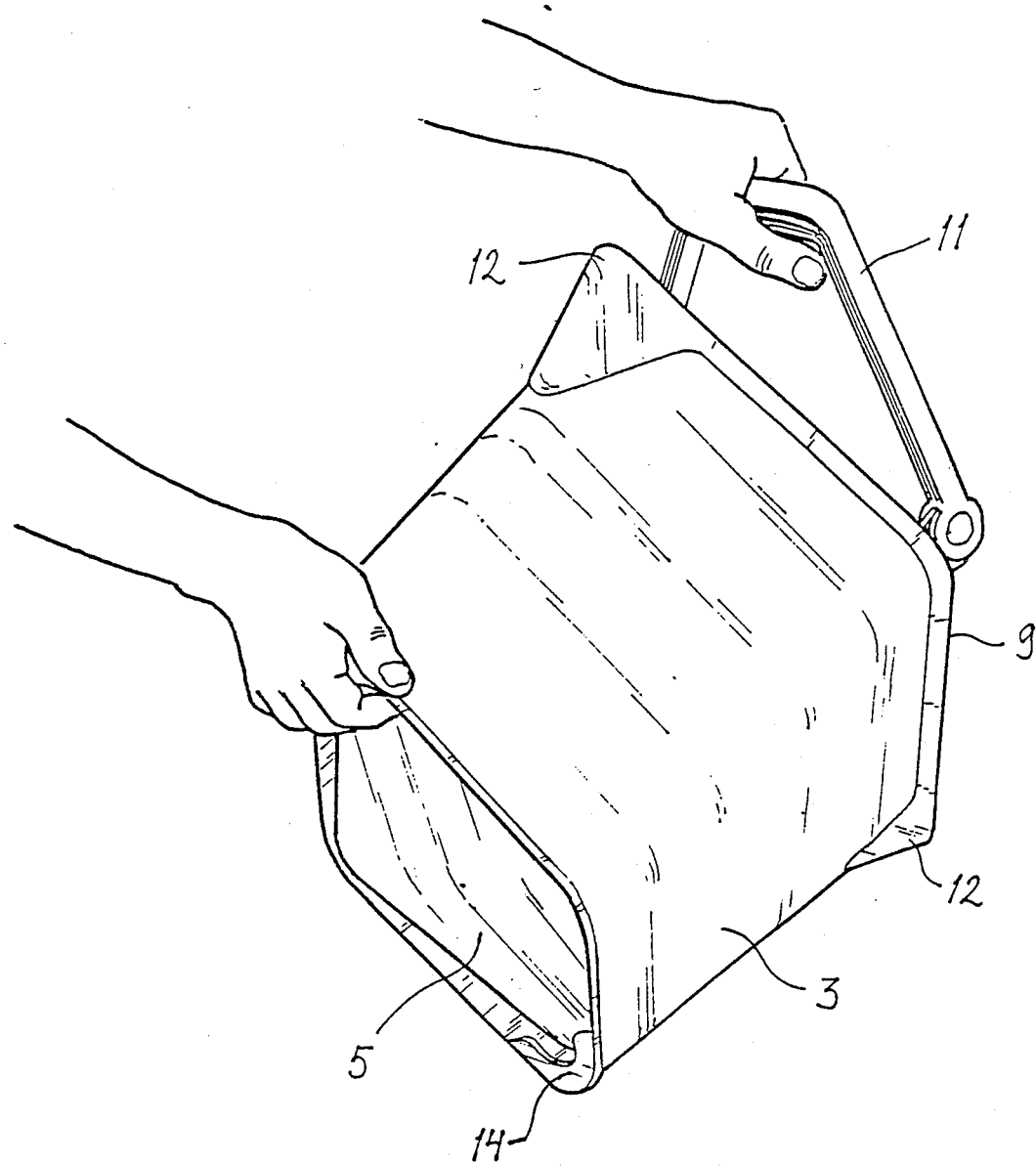
FIG. 7 illustrates the use of the container of the invention.
Figure 8:
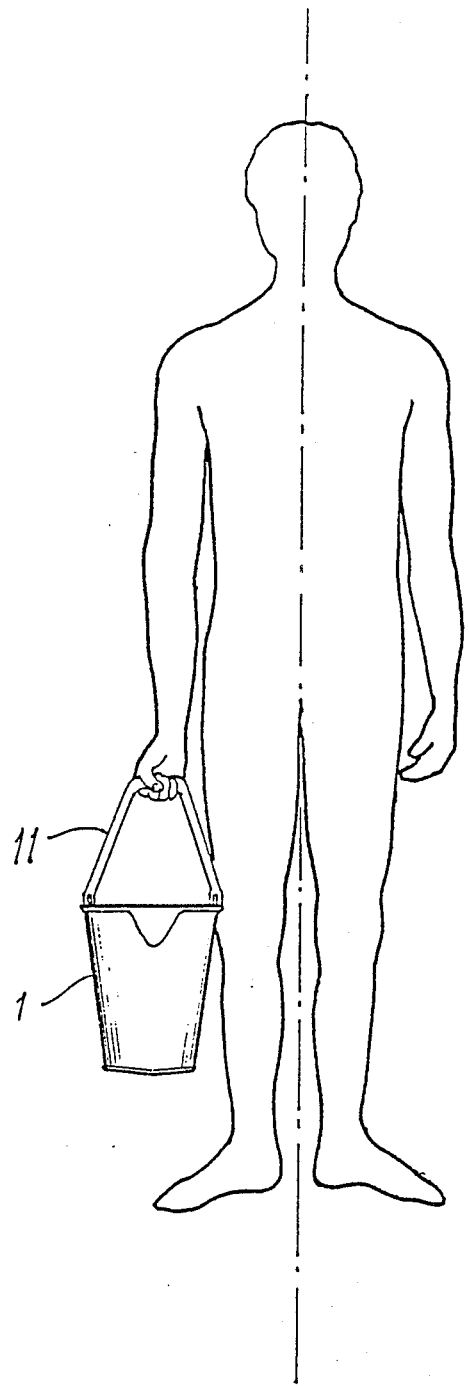
FIG. 8 illustrates the position of the container in relation to the operator on carrying the container.

As illustrated by FIG. 8, the container can be carried by a person in a conventional manner, but due to the outer horizontal cross-section, more closely to the body than the conventional round buckets. Consequently, the arm need not be stretched far from the body. As a bucket is usually carried slightly in front of the legs, the fact that the cross-section has straight or slightly curved sections between the corners makes it possible to position the center of gravity of the containers even closer to the body one such section adjacent to one of the legs (see FIG. 8). The horizontal cross-section of the inner side surface 4 of the receptacle 2 is preferably identical with the outer cross-section, in which event the same volume of material can be retained in the receptacle 2 as in the case of receptacles of equal inner cross-section area, but of round shape. The container can be now positioned in an ergonomically favorable position on carrying it, so that the direction of oblongness extends parallelly with the direction of carrying the container, or parallelly with the direction of other operations, such as pouring material out of the receptacle 2 by tilting it in a vertical plane coinciding with the direction of oblongness. This latter possibility is illustrated in FIG. 7.

For making it easier to handle material, the area of the outer side surface 3 and the inner side surface 4 below the brim project outwards of the rest of the outer and inner surface towards the direction of oblongness at the region of one extremity (one of the corners) of the oblong cross-section of the outer side surface 3. In this fashion a visible spout 12 is formed as an outwardly projecting part of the side wall 7 at the region of said extremity, which in the case of the rhombic cross-section is the area around the acute angle of the rhomb. As seen in the Figures, a similar spout 12 is formed at the opposite extremity of the rhomb. The spouts 12 point towards opposite directions and due to this arrangement the material can be poured out of the receptacle 2 by tilting the receptacle portion 1 towards one or another direction, depending on whichever spout 12 is in the most suitable position for such an operation.

Figure 5:
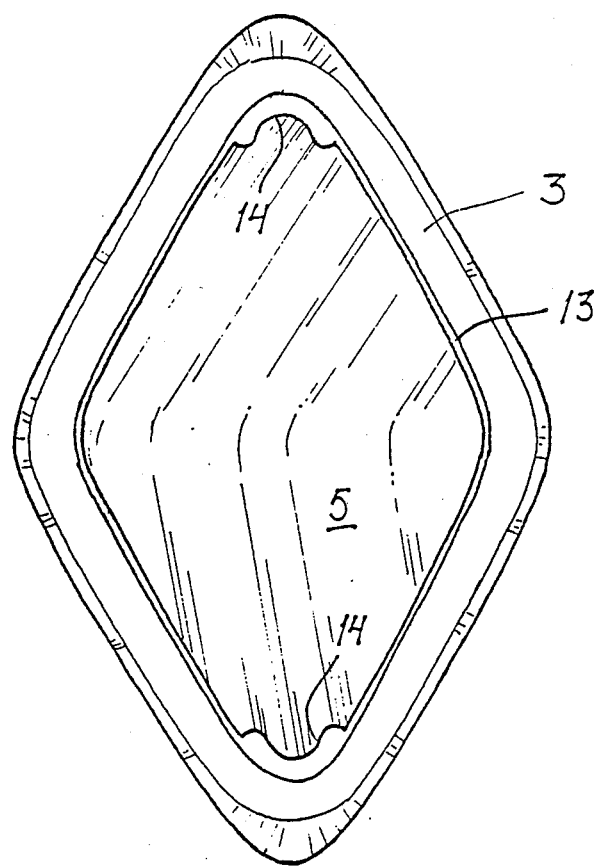
FIG. 5 is a bottom view of the container of the invention.

As illustrated by FIG. 4, the side wall 7 of the receptacle portion 1 extend downwards to such an extent that they terminate below the outer surface 5 of the bottom wall 8. The lowermost edge of the side wall 7 coincides with a horizontal plane so that the receptacle portion can well be placed on an even support surface. As best seen in FIG. 5 the lowermost edge, designated by reference numeral 13, also has a rhombic shape. It is self-evident, that the lowermost edge 13 does not need to coincide with the plane in its entirety, but it is sufficient, if the most portion of the edge follows this plane so that the container is well supported from underneath by an even support surface.

As seen in FIG. 4, the outer bottom surface 5 has a cross-section of a wide V in a vertical plane that extends in the direction of oblongness of the receptacle portion. In this fashion the outer bottom surface 5 consists of two portions, 5a and 5b respectively, inclined with regard to each other and joining at the lowermost region of the outer bottom surface 5, this region extending in a ridge-like fashion transversally to the direction of oblongness of the receptacle portion 1 and coinciding with the shorter diagonal line of the rhombic shape of the lowermost edge 13. The outer bottom surface 5 is located farthest from the lower edge 13 at the regions of the two extremities (the two corners with acute angles facing the center of the rhomb) of the rhombic shape. At this region the distance of the lowermost edge 13 of the side wall 7 from the outer bottom surface 5 is greatest, thus leaving space for a grip 14. The grip 14 is formed by a planar portion extending some distance from the lower edge 13 at the region of the extremity of the rhombic shape of the lowermost edge 13. The planar portion extends with its lower surface, coinciding with the same plane as the lower edge 13 follows, towards the center of the bottom surface 5 to such extent that fingers of the hand can well be placed behind the edge 13 and the fingertips can be supported by the interior surface of the planar portion 14 when tilting the container, as is best seen in FIG. 7. A grip similar in shape and also extending towards the center is formed at the opposite extremity of the outer edge 13 as well.

Since the lowermost edge 13 comprises two grips 14 and the upper brim 9 comprises two spouts 12 above the respective grips, the receptacle portion 1 can be tilted on either side, depending on which side is best located.

The bottom wall 8 of the receptacle portion is of equal thickness so that the inner bottom surface 6 of the receptacle 2 is shaped in conformity with the outer bottom surface 5. Consequently, the deepest point of the inner bottom surface 6 extends transversally to the direction of oblongness of the receptacle portion 1, more precisely, the deepest area extends along the shorter diagonal line of the rhombic configuration.

Depending on the material which shall be handled by the container, this kind of receptacle bottom configuration may be advantageous, giving a possibility to collect, for example heavier impurities in liquies on the lowest point of the inner bottom surface 6.

Further, as seen in FIG. 4, the distance from the highest point of the handle 11 from the center line between the fixing points of the handle is such that when the handle 11 is lowered towards the brim 9, it stops on the brim and does not descend further below the brim.

Figure 6:
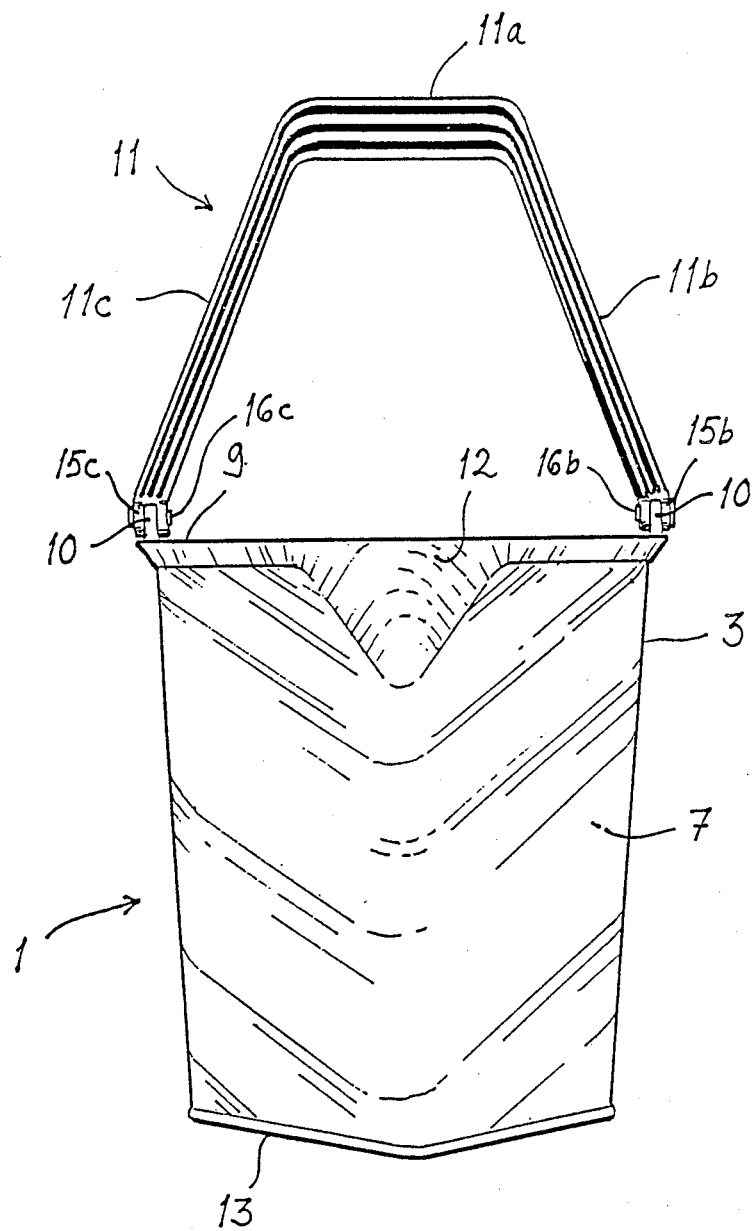
FIG. 6 is a front elevational view of the container of the invention.

From FIG. 6 it can be seen that the handle 11 is designed ergonomically so, that it comprises a straight horizontal mid portion 11a for the hand and two legs 11b and 11c leaving the horizontal mid portion 11a in an obtuse angle and terminating at their free ends in their respective brackets, 15b and 15c respectively, which receive their respective lugs 10 and the respective journal pins 16b and 16c, each going through the associated brackets and lug. The extension of the brim 9 towards the direction of the oblongness of the receptacle portion 1 is so dimensioned that when the handle 11 is lowered, the horizontal mid-portion 11a stops on the spout portion 12 of the brim 9.

While the form of the container herein described constitutes a preferred embodiment of this invention, it is to be understood that the present invention is not limited to this precise form of container, and that changes may be made therein without departing from the scope of the invention which is defined in the appended claims.

I claim:

1. A container of an upwardly open type, such as a bucket, comprising:

a receptacle portion and a handle for carrying the receptacle portion in a suspended position;

a receptacle of a predetermined depth provided in the receptacle portion for receiving material therein, the receptacle being defined by an inner side wall terminating in an upward direction in a brim, and an inner bottom surface, the receptacle being contained within the receptacle portion defined by an outer side surface and an outer bottom surface, the surfaces constituting the main outer space-requiring dimensions of the container;

the outer side surface terminating in an upward direction in the brim and forming a cross-section area of substantially similar configuration along the most part of the direction of depth of the receptacle in a plane perpendicular to the direction of depth of said receptacle;

wherein the cross-section area is of an oblong configuration for allowing the container to be positioned in an ergonomically favorable position for carrying and handling, the direction of oblongness extending substantially parallel with the direction of operation of the container; and wherein the brim and the area of the outer side surface which is immediately below it project outwardly towards the direction of oblongness at the region of one extremity of the oblong cross-section to form a spout in order to facilitate pouring of the material out of the receptacle.

2. A container as claimed in claim 1, wherein the handle is U-shaped and fastened at its free ends to the brim of the container such that the connecting line between the points fastened to the brim extends transversely to the direction of oblongness of the receptacle portion.

3. A container as claimed in claim 1, wherein the oblong cross-section area is of a symmetrical configuration in a mirror image fashion with regard to a center line extending in the direction of oblongness.

4. A container as claimed in claim 1, wherein the oblong cross-section has a configuration of a closed tetragon.

5. A container as claimed in claim 1, wherein the configuration is rhombic.

6. A container as claimed sin claim 1, wherein the receptacle portion comprises two spouts formed by projecting outwardly the brim and the area of the outer side surface immediately below the brim, towards the direction of the oblongness at the region of opposite extremities of the oblong cross-section, thus forming spouts pointing at substantially opposite directions.

7. A container as claimed in claim 1, wherein the outer side surface of the receptacle portion extends below the outer bottom surface of the receptacle portion at the region of one extremity of the oblong cross-section, forming a grip for a hand behind the outer side surface at the region.

8. A container as claimed in claim 1, wherein the outer side surface of the receptacle portion extends below the outer bottom surface of the receptacle portion at the regions of the opposite extremities of the oblong cross-section, forming grips for a hand behind the outer side surface at the regions.

9. A container as claimed in claim 8, wherein the outer bottom surface of the receptacle portion has a cross-section of a wide V in a vertical plane extending in the direction of oblongness of the receptacle portion whereby the grips for a hand at the regions of the opposite extremities are formed by the elevated positions of the end regions of the outer bottom surface corresponding to the free ends of the V-shape.

10. A container as claimed in claim 9, wherein said inner bottom surface of the receptacle has the shape of a wide V in a vertical plane extending in the direction of oblongness of the receptacle portion.

11. A container as claimed in claim 1, wherein the oblong cross-section has a configuration of a closed tetragon, the handle being U-shaped and fixed pivotably at its free ends at the region of two opposite corners of the tetragon, the diagonal line between the two opposite corners being shorter than the diagonal line between the remaining two opposite corners, the remaining two opposite corners facing the direction of the oblongness of the receptacle portion.

12. A container as claimed in claim 11, wherein the configuration is rhombic.

* * * * *